United States Patent [19]

Brown

[11] Patent Number: 4,609,782
[45] Date of Patent: Sep. 2, 1986

[54] SOLID STATE SIGNAL INSERTION CIRCUIT AND METHOD FOR USE IN A TELEPHONY SYSTEM OR THE LIKE

[75] Inventor: Leland T. Brown, Phoenix, Ariz.

[73] Assignee: Motorola, Inc., Schaumburg, Ill.

[21] Appl. No.: 565,951

[22] Filed: Dec. 27, 1983

[51] Int. Cl.[4] .............................................. H04M 3/02
[52] U.S. Cl. ........................ 179/18 HB; 179/18 FA; 179/84 R
[58] Field of Search .......... 179/18 HB, 18 FA, 81 R, 179/84 R, 84 T, 16 AA, 170 NC, 16 EA, 84 A, 84 L, 99 LS, 99 LC; 323/239, 324; 307/311, 324, 252 B, 252 N, 252 A

[56] References Cited

U.S. PATENT DOCUMENTS

| | | | |
|---|---|---|---|
| 3,914,556 | 10/1975 | Frazee | 179/18 F |
| 4,119,905 | 10/1978 | Head | 323/21 |
| 4,262,172 | 4/1981 | Brolin | 179/18 HB |
| 4,361,798 | 11/1982 | Tolmie, Jr. | 323/324 |

OTHER PUBLICATIONS

"Electronic Line Pack with Opto-Electronic Line Isolation", M. A. Patten, IBM Technical Disclosure Bulletin, vol. 20, No. 1, Jun. 1977, pp. 375-376.

"One Chip Closes in on SLIC Functions", L. Brown et al., Electronic Design, Sep. 27, 1980, pp. 85-91.

Primary Examiner—Gene Z. Rubinson
Assistant Examiner—R. Vaas
Attorney, Agent, or Firm—Michael D. Bingham

[57] ABSTRACT

A solid state insertion circuit comprising an opto-coupler triac driver is activated by a solid state switch to insert a ringing signal onto a subscriber telephone path in order to ring, for instance, a telephone. The opto-coupler driver functions as a zero voltage crossing triac to apply the ringing signal onto the telephone line only at a zero voltage cross-over thereof to thereby inhibit noise transients from being generated.

3 Claims, 3 Drawing Figures

SOLID STATE SIGNAL INSERTION CIRCUIT AND METHOD FOR USE IN A TELEPHONY SYSTEM OR THE LIKE

BACKGROUND OF THE INVENTION

The present invention relates to telephony systems and, more particularly, to a circuit and method for inserting an alternating current (AC) ringing signal onto the subscriber loop side of the telephone line to a telephone.

In most, if not all, present day U.S. telephone systems a ringing relay is utilized which, when enabled from the telephone central office, inserts a ringing signal onto the subscriber loop path that includes the subscriber telephone. The ringing signal is typically at a nominal frequency of 20 hertz and between 70-130 volts RMS. The ringing signal is used to energize the clapper-bell of a telephone to indicate that a telephone call is being received, as is understood. During the ringing cycle a closed conduction path is provided for a ringing generator, located at the central office, through the telephone and the ringing relay to earth ground. As the ringing relay is energized the normal signal conversion path is open circuited from the subscriber loop path and, at the same time, the ringing relay connects the Ring side of the subscriber loop directly to the ringing generator while grounding the Tip side to earth ground through a series connected resistor. This action provides a low impedance path for the AC ringing signal through the subscriber telephone.

The use of a ringing relay suffers from several disadvantages. The relays are relatively expensive and bulky. Further, the relay contacts tend to wear out and/or corrode over time and therefore need to be continually replaced. In addition, the relays can cause electrical transients to be generated during normal operation. These transients can be coupled or induced into adjacent telephone cable pairs to produce noise on adjacent subscriber loop paths.

Thus, there is a need for a solid state ringing insertion circuit to overcome the above disadvantages. Such a circuit would be relatively less expensive than ringing relays conventionally used.

SUMMARY OF THE INVENTION

Accordingly, it is an object of the present invention to provide an improved circuit for inserting an AC signal onto a transmission path.

Another object of the present invention is to provide an improved circuit for inserting a ringing signal on to the subscriber loop path of a telephone system.

Still another object of the present invention is to provide a solid state circuit for inserting an alternating ringing signal onto the subscriber loop path of a telephone system.

A still further object of the present invention is to provide an improved method for inserting a ringing signal onto the subscriber loop path of the telephone system.

In accordance with the above and other objects there is provided a circuit for inserting an alternating signal onto a transmission path connected between first and second terminals wherein the circuit comprises an opto-coupler circuit for applying the alternating signal to the first terminal when the opto-coupler device is energized and a solid state switch which is responsive to an enabling signal for energizing the opto-coupler device wherein the alternating signal flows through the transmission path.

DETAILED DESCRIPTION OF THE PREFERRED EMBODIMENTS

Figure 1:
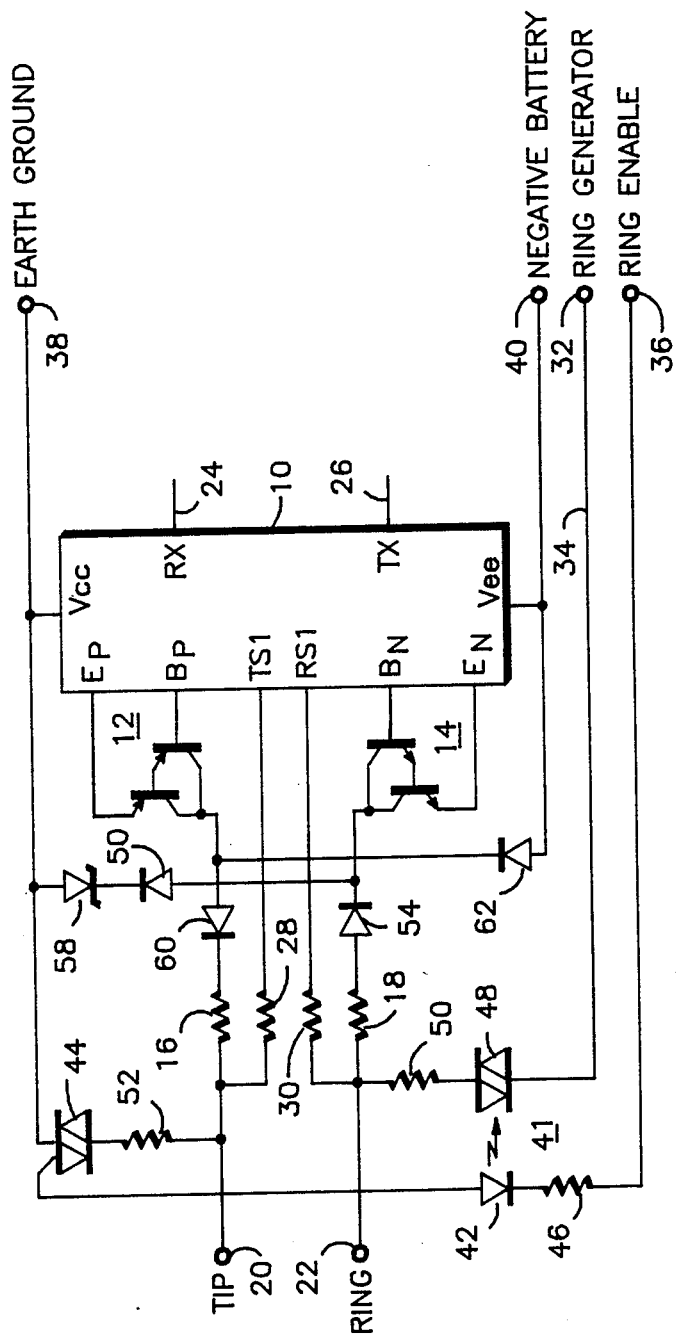
FIG. 1 is a partial block diagram and schematic illustrating the signal insertion circuit of an embodiment of the invention in combination with a telephony system.

Turning to FIG. 1, there is shown a circuit for inserting a ringing signal onto a telephone line in order to ring a subscriber telephone. For ease of description the signal insertion circuits of the embodiments to be herein described are illustrated in combination with a solid state hybrid circuit 10. Hybrid circuit 10 provides four wire-to-balanced two wire signal conversion in combination with amplifiers 12 and 14 within a telephony system as is well known. Hence, hybrid circuit 10 is generally located at the telephone central office location and is coupled to the subscriber bidirectional loop path at Tip and Ring terminals 20 and 22 respectively. A subscriber load device (not shown), for instance, a telephone, would be coupled via telephone cable pairs to terminals 20 and 22. An example of a device that may be utilized to provide the signal conversion functions of hybrid circuit 10 is the MC3419: a subscriber loop interface circuit (SLIC) that is manufactured by Motorola, Inc. Thus, in a normal communication mode SLIC 10, which is connected between terminals 38 and 40 to an operating bias potential, receives a unidirectional transmission signal at port $R_x$, terminal 24, to produce a differential signal across Tip and Ring terminals 20 and 22 via resistors 16 and 18. Similarly, a differential signal supplied from the subscriber and appearing across terminals 20 and 22 is converted by SLIC 10 to a unidirectional transmit signal at port $T_x$ (26). Among other functions, sense resistors 28 and 30 activate SLIC 10 by sensing a direct current therethrough which results when the subscriber load device, such as a telephone, being lifted off hook. While the telephone is "on-hook" transistors 12 and 14 are in a non-conducting state and hybrid circuit 10 is turned off. A detailed description of the operation and functions of SLIC 10 is described in U.S. Pat. No. 4,300,023 which is incorporated herein by reference made hereto.

In most, if not all, U.S. telephone systems a ring generator (not shown) is supplied at the telephone central office and is connected to terminal 32. The ring generator supplies a ringing signal superimposed onto a direct current voltage as is understood. This ringing signal is at a nominal frequency of 20 hertz and varies between 70-130 volts RMS. In contemporary telephone systems, the ringing signal is inserted onto the subscriber loop transmission path at terminal 22 through a ring relay that is energized by a ring enable signal generated at the telephone central office as aforedescribed.

In the embodiment of FIG. 1, the ringing signal is coupled via lead 34 to opto-coupler means 41 of the present invention. In normal operation, opto-coupler means 41 is nonconducting to allow normal signal conversion function of SLIC 10. However, during the ringing mode, when it is desired to insert the ringing signal onto the subscriber path, opto-coupler means 41 is rendered conductive as will be hereinafter described. A ring enabling signal is supplied at terminal 36 to complete a bias conduction path between terminals 36 and terminals 38. This will cause light emitting diode 42 to be rendered conductive. In turn, triac 44, which operates as a solid state switch means, provides a direct current (DC) conduction path between terminals 36 and 38 via resistor 46 and diode 42. Triac driver device 48 which is optically coupled to diode 42 is thereby rendered conductive to insert the ringing signal through resistor 50 onto the subscriper loop at ring terminal 22. The complete conduction path for the AC ringing signal is through the subscriber loop transmission path (terminals 22 to 20), resistor 52 and, via triac 44, to terminal 38.

In combination with the insertion circuit described above, diode 54 provides overvoltage protection to negative voltage conditions appearing at Ring terminal 22. Negative voltage transients will reverse bias diode 54 to thereby protect SLIC 10. Protection from positive overvoltage conditions at terminal 22 is provided through diode 56 and series connected Zener diode 58 to earth-ground. Moreover, transistor 14 being non-conducting during "on-hook" conditions protects SLIC 10 from being damaged by positive excursions of the ringing signal. Similarly, protection against positive and negative over-voltage conditions occurring at Tip terminal 20 is provided by diodes 60 and 62.

Light emitting diode 42 and optically connected triac 48 comprise a zero voltage crossing, opto-coupler triac driver. Thus, insertion of the ringing signal happens only on the zero voltage crossing of the signal. Likewise, the ringing signal is disconnected from Ring terminal 22 in response to the subscriber load device being lifted off hook only on a zero current crossing thereof due to the operation of the triac driver means 41. Hence, the advantage of the present embodiment over the prior art is that voltage and current spikes, which can otherwise occur when a ring relay is utilized, are eliminated. Moreover, the need for individual snubber circuits, required by conventional relay circuits, are eliminated. An opto-coupled triac driver of the type aforedescribed is the MOC3030 which is manufactured by Motorola, Inc.

Figure 2:
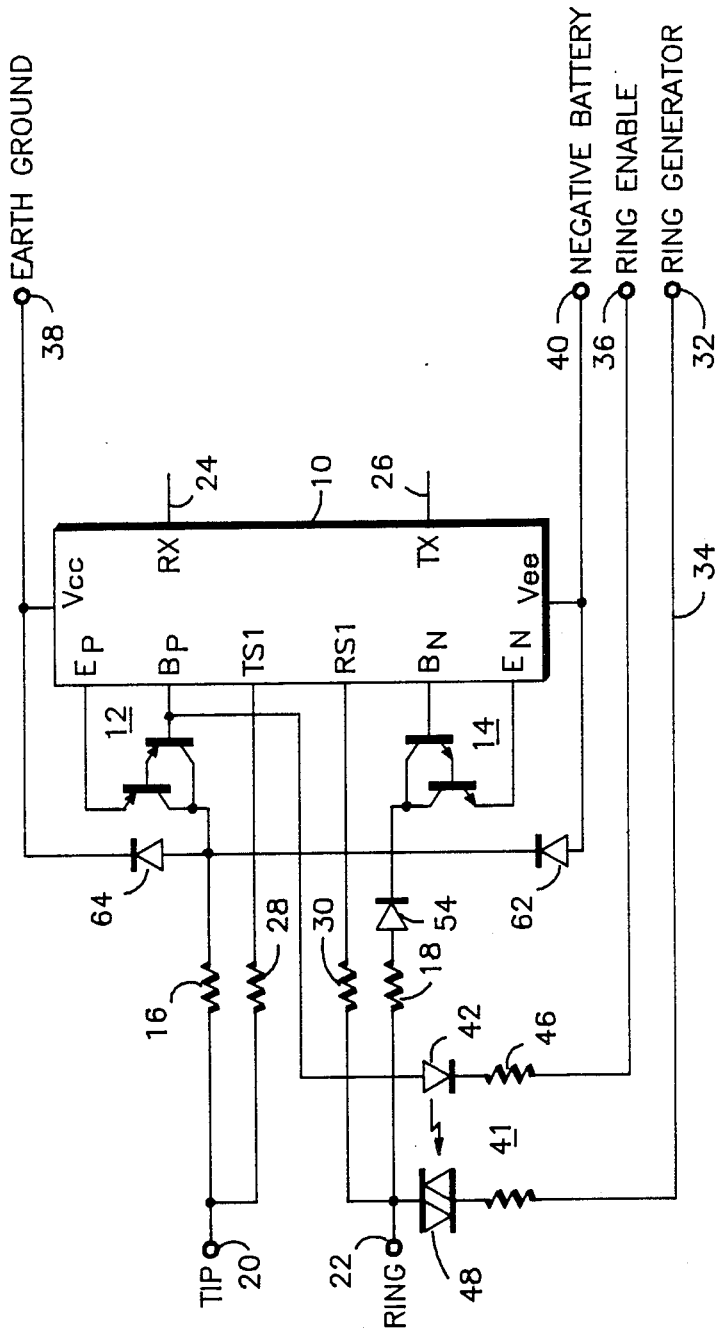
FIG. 2 is a partial schematic and block diagram of another embodiment of the invention.

Referring to FIG. 2, there is shown another embodiment of the present invention utilizing the aforementioned zero crossing opto-coupler triac device for inserting the ringing signal onto the subscriber loop path. It is to be understood that components of FIG. 2 corresponding to components of FIG. 1 are referenced by the same numerals. Opto-coupler triac driver 41 is utilized in combination with the base-emitter (PN) junction of Darlington amplifier 12 to provide the insertion function. It is to be understood that the emitter of Darlington amplifier 12, either through use in combination with SLIC 10 or separately, is connected to earth-ground terminal 38. Therefore, in response to the correct polarity enable signal being supplied at the telephone central office to terminal 36 during the ringing mode, light emitting diode 42 is energized as Darlington amplifier 12 is rendered conductive to supply drive current from earth ground terminal 38 through the emitter-base junction of transistor 12 and diode 42 to terminal 36. Triac 48 is thereby turned on to provide an alternating current path through Ring terminal 22, through the subscriber loop, and back through Tip terminal 20 and through either diode 64 or Darlington amplifier 12 to ground. In this embodiment amplifier 12 provides the function of the solid state switch means.

Figure 3:
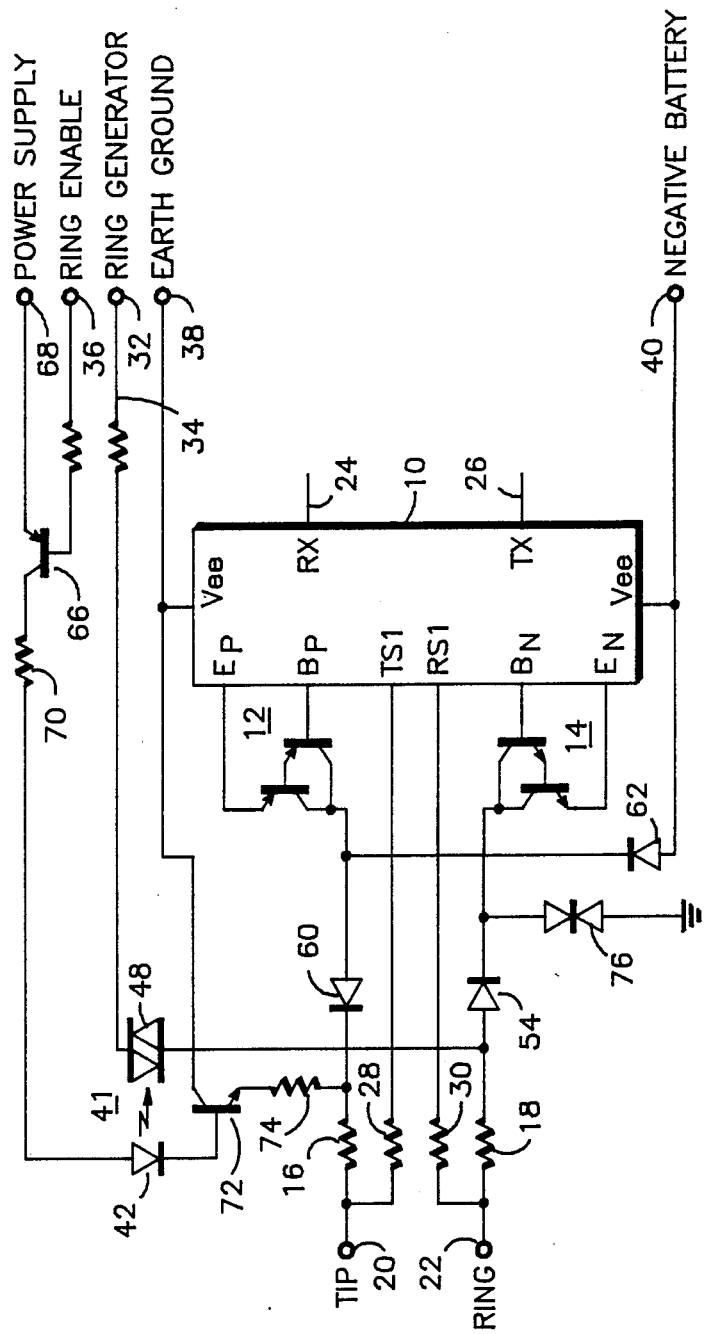
FIG. 3 is a partial block and schematic diagram of still another embodiment of the present invention.

A ring signal insertion circuit is illustrated in FIG. 3 of still another embodiment of the present invention. Similarly, components of FIG. 3 corresponding to like components of FIGS. 1 and 2 are designated by the same reference numerals. In the present embodiment, the ringing signal insertion function is provided when transistor 66 is forward biased by the ring enable signal being supplied at terminal 36. This causes the emitter-base junction of transistor 66 to become forward biased to thereby render this transistor conductive. As transistor 66 turns on current flow is established through resistor 70, from power supply terminal 68, via transistor 66, and through diode 42 of the opto-coupler triac device. Transistor 72 is driven into saturation by diode 42 being rendered conductive to provide a return path for the current flow through diode 42 to ground via the forward biased base-collector junction of transistor 72. Triac 48 is thereby rendered conductive to insert the ringing signal, which is supplied at terminal 32, onto Ring terminal 22 and the subscriber loop path. The complete return path for the ringing signal is through the subscriber loop path, including the telephone ringing circuit, and through resistor 74 and transistor 72 to earth ground.

Positive over-voltage protection may be provided at ring terminal 22 by protection device 76, a MKIV-135(Sidac) device manufactured by Motorola, Inc.

Thus, what has been described above are novel insertion circuits for applying an alternating signal, such as a ringing signal, onto a telephone line during a ring insertion mode of operation of the telephony system. The novel circuits employ the use of an opto-coupler triac driver that performs the function of a zero voltage crossing, bilateral triac. Insertion of the ringing signal can therefore only occur at a zero voltage crossing of the signal. Similarly, removal of this ringing signal occurs only at a zero current crossing thereof. Hence, noise transients are inhibited from occurring during insertion and removal of the ringing signal.

I claim:

1. A circuit for inserting an alternating current (ac) signal onto a transmission path that is connected between a pair of terminals, comprising:

an auto-coupler device including a light emitting diode that is rendered conductive in response to an enabling signal applied to the circuit and a triac device optically coupled to said light emitting diode which is rendered conductive by said light emitting diode being rendered conductive for directly inserting the ac signal onto the transmission path at a first one of the pair of terminals, said triac device having a first electrode coupled to said first one of the pair of terminals and a second electrode to which the ac signal is applied; and solid state switch means coupled in series with said light emitting diode including a second triac device having a control electrode coupled to said light emitting diode, a first electrode coupled to the second one of the pair of terminals and a second electrode coupled to a third terminal at which is supplied ground reference.

2. A circuit for inserting an alternating current (ac) signal onto a transmission path that is connected between a pair of terminals, comprising:

an opto-coupler device including a light emitting diode that is rendered conductive in response to an enabling signal applied to the circuit and a triac device optically coupled to said light emitting diode which is rendered conductive by said light emitting diode being rendered conductive for directly inserting the ac signal onto the transmission path at a first one of the pair of terminals, said triac device having a first electrode coupled to said first one of the pair of terminals and a second electrode to which the ac signal is applied; and solid state switch means responsive to said enabling signal for providing a direct current conduction path to said light emitting diode, said solid state switch means including a first transistor having first, second and control electrodes, said first electrode being coupled to a third terminal at which is supplied a bias potential, said second electrode being coupled to said light emitting diode and said control electrode being coupled to a fourth terminal at which is supplied said enabling signal; and a second transistor having first, second and control electrodes, said first electrode being coupled to a second one of the pair of terminals, said second electrode being coupled to a fifth terminal at which is supplied ground reference, and said control electrode being coupled to said light emitting diode such that said light emitting diode is series connected between said second electrode of said first transistor and said control electrode of said second transistor.

3. In a telephone system including a hybrid circuit for providing four wire-to-two wire signal conversion to a subscriber loop connected between a pair of terminals to the hybrid circuit, a circuit for inserting a ringing alternating signal onto the subscriber loop at a first one of the pair of terminals upon the zero voltage cross over of the ringing signal, comprising:

a light emitting diode;

a triac device optically coupled to said light emitting diode having a first electrode coupled to the first one of the pair of terminals and a second electrode coupled to a third terminal to which is supplied the ringing signal; and a second triac device having a control electrode coupled to the anode of said light emitting diode, a first electrode coupled to a second one of the pair of terminals and a second electrode coupled to a fourth terminal to which is supplied earth ground potential, the cathode of said light emitting diode being coupled to a fifth terminal at which an enabling signal is applied for rendering said light emitting diode and said second triac device conductive which in turn renders said first triac device conductive to place the ringing signal onto the subscriber loop at a zero voltage crossover thereof.

* * * * *